(12) United States Patent
Yasumura

(10) Patent No.: US 12,184,130 B2
(45) Date of Patent: Dec. 31, 2024

(54) MOTOR

(71) Applicant: NIDEC CORPORATION, Kyoto (JP)

(72) Inventor: Tsuyoshi Yasumura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 129 days.

(21) Appl. No.: 18/046,938

(22) Filed: Oct. 17, 2022

(65) Prior Publication Data

US 2023/0132006 A1  Apr. 27, 2023

(30) Foreign Application Priority Data

Oct. 26, 2021 (JP) .................. 2021-174305

(51) Int. Cl.
*H02K 11/40* (2016.01)
*H02K 5/06* (2006.01)
*H02K 11/01* (2016.01)
*H02K 11/25* (2016.01)
*H02P 29/024* (2016.01)
*H02P 29/032* (2016.01)

(52) U.S. Cl.
CPC .............. *H02K 11/40* (2016.01); *H02K 5/06* (2013.01); *H02K 11/0141* (2020.08); *H02K 11/25* (2016.01); *H02P 29/027* (2013.01); *H02P 29/032* (2016.02); *H02K 2211/03* (2013.01)

(58) Field of Classification Search
CPC ...... H02K 11/40; H02K 5/06; H02K 11/0141; H02K 11/25; H02K 2211/03; H02K 7/14; H02K 5/225; H02K 11/27; H02K 11/33; H02P 29/027; H02P 29/032
USPC .................. 318/400.22, 400.21, 400.01, 700
See application file for complete search history.

(56) References Cited

U.S. PATENT DOCUMENTS

| 7,622,873 | B2* | 11/2009 | Takata ..................... H02P 6/182 |
| | | | 318/362 |
| 7,843,674 | B2* | 11/2010 | Uchiyama .............. H02M 1/32 |
| | | | 318/400.29 |
| 9,810,020 | B2* | 11/2017 | Adams ..................... E06B 9/323 |
| 10,673,360 | B2* | 6/2020 | Matsuhisa ............... H02P 6/085 |
| 11,336,155 | B2* | 5/2022 | Seima ..................... H05K 1/181 |

* cited by examiner

*Primary Examiner* — David Luo
(74) *Attorney, Agent, or Firm* — HAUPTMAN HAM, LLP

(57) ABSTRACT

A motor includes a motor control circuit having a ground terminal, and a current limiting part disposed on a path electrically connecting the ground terminal and an external ground terminal included in an external circuit disposed outside the motor.

10 Claims, 5 Drawing Sheets

MOTOR

CROSS-REFERENCE TO RELATED APPLICATIONS

The present invention claims priority under 35 U.S.C. § 119 to Japanese Patent Application No. 2021-174305 filed on Oct. 26, 2021, the entire content of which is incorporated herein by reference.

FIELD OF THE INVENTION

The present disclosure relates to a motor.

BACKGROUND

Conventionally, it is known that a motor is provided with a motor control circuit having a ground terminal.

Here, when a ground terminal of an external circuit provided outside the motor is electrically connected to a ground terminal in the motor control circuit, a current flowing from the ground terminal of the external circuit toward the ground terminal in the motor control circuit may adversely affect the motor.

SUMMARY

An exemplary motor of the present disclosure includes a motor control circuit having a ground terminal, and a current limiting part disposed on a path electrically connecting the ground terminal and an external ground terminal included in an external circuit disposed outside the motor.

The above and other elements, features, steps, characteristics and advantages of the present disclosure will become more apparent from the following detailed description of the preferred embodiments with reference to the attached drawings.

DETAILED DESCRIPTION

Figure 1:
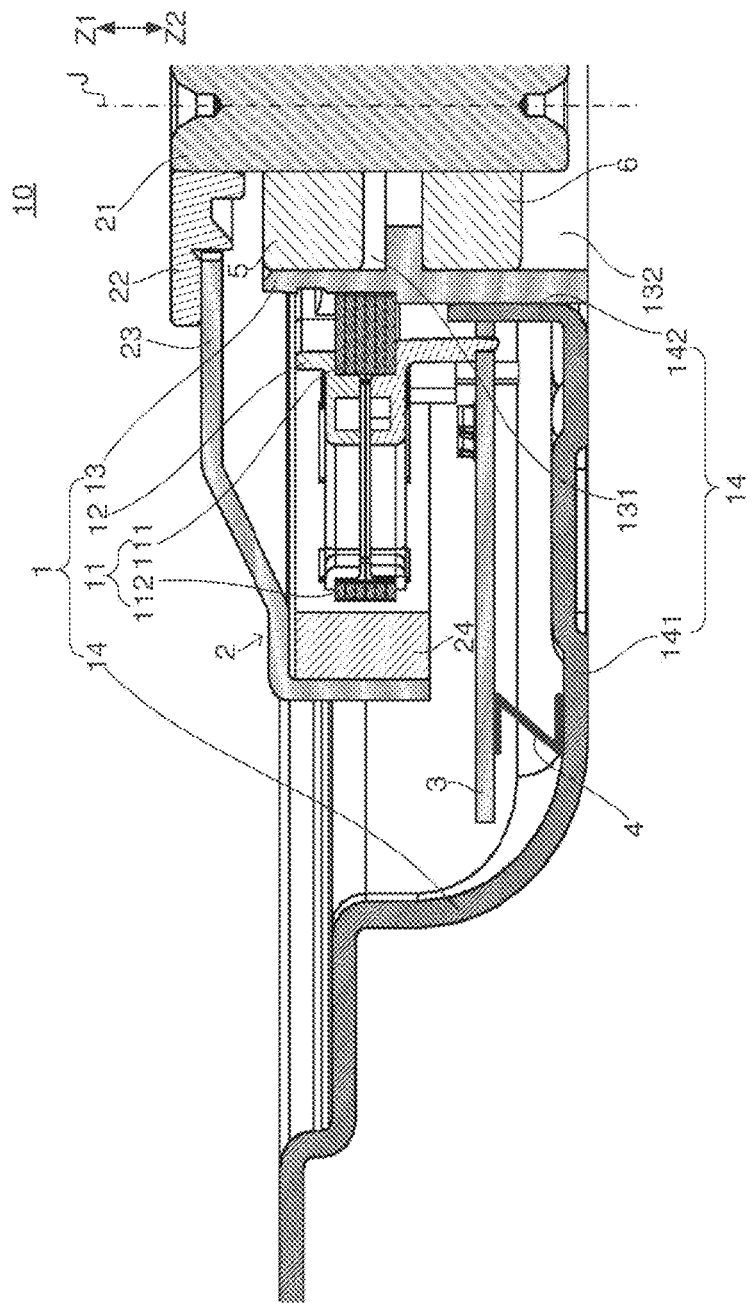
FIG. 1 is a partial vertical sectional view of a motor.

Hereinafter, exemplary embodiments of the present disclosure will be described with reference to the drawings. In the present specification, a direction in which a central axis J of a motor 10 extends is referred to as an "axial direction", and one side in the axial direction is denoted by Z1 and the other side in the axial direction is denoted by Z2 in the drawings. A radial direction about the central axis J is simply referred to as a "radial direction".

FIG. 1 is a partial vertical sectional view of the motor 10. FIG. 1 is a sectional view taken along a plane including the central axis J. As illustrated in FIG. 1, the motor 10 includes a stator 1, a rotor 2, a board 3, an on-board contact 4, a first bearing part 5, and a second bearing part 6. The motor 10 is a brushless DC motor.

The stator 1 includes a stator core 11, an insulator 12, a bearing holder 13, and a sheet metal housing 14. In addition, the stator 1 includes a coil (not illustrated).

The stator core 11 is formed by laminating electromagnetic steel plates in the axial direction, and includes a core back 111 and teeth 112. The core back 111 has an annular shape centered on the central axis J. The teeth 112 are arranged to project radially outward from a radially outer surface of the core back 111. The teeth 112 are disposed in the circumferential direction.

The insulator 12 is formed of an insulating material, and is attached to the teeth 112 from each of one side in the axial direction and the other side in the axial direction. The coil is formed by winding a conducting wire around the insulator 12.

The bearing holder 13 has a cylindrical shape extending in the vertical direction around the central axis J. The radially inner peripheral surface of the core back 111 is fixed to the radially outer peripheral surface of the bearing holder 13. The bearing holder 13 includes a first housing portion 131 on one side in the axial direction and a second housing portion 132 on the other side in the axial direction.

The sheet metal housing 14 is a metal housing and is formed around the central axis J. The sheet metal housing 14 includes a bottom portion 141 disposed on the other side in the axial direction, and a cylindrical portion 142 protruding from a radially inner end of the bottom portion 141 toward the one side in the axial direction. The radially inner peripheral surface of the cylindrical portion 142 is fixed to the radially outer peripheral surface of the other axial end of the bearing holder 13.

The board 3 is a rigid printed board. The board 3 is provided with a motor control circuit 31 and the like to be described later. The board 3 is fixed to the other axial end of the insulator 12.

The on-board contact 4 is a metal elastic member and is disposed between the board 3 and the sheet metal housing 14. The on-board contact 4 is pressed against the other axial side surface of the board 3 and the bottom portion 141 to establish electrical connection between the board 3 and the on-board contact 4.

The sheet metal housing 14 covers the stator core 11, the insulator 12, and the coil (not illustrated) which are a part of the stator 1, the board 3, the on-board contact 4, and a rotor housing 23 and a magnet 24 which are a part of the rotor 2 to be described later, from the other side in the axial direction. The sheet metal housing 14 suppresses radiation of noise generated by the current flowing through the coil to the outside, and suppresses noise entering from the outside.

The first bearing part 5 and the second bearing part 6 are ball bearings. The first bearing part 5 is housed in the first housing portion 131. The second bearing part 6 is housed in the second housing portion 132.

The rotor 2 includes a shaft 21, a connecting portion 22, the rotor housing 23, and the magnet 24.

The shaft 21 has a columnar shape extending in the axial direction, and is rotatably supported around the central axis J by the first bearing part 5 and the second bearing part 6. The connecting portion 22 is fixed to one axial end of the shaft 21, and connects the shaft 21 and the rotor housing 23 in the radial direction. The rotor housing 23 is formed around the central axis J. The magnet 24 has an annular shape centered on the central axis J, and is fixed to the radially inner peripheral surface of the rotor housing 23. The magnet 24 is radially opposed to the teeth 112 at the radially outer side of the teeth 112.

When a current flows through a coil (not illustrated) of the stator 1 under the control of a motor control circuit 31 described later, the rotor 2 is rotationally driven around the central axis J by the action of magnetism generated in the coil and the magnet 24.

By attaching an impeller (not illustrated) to the rotor housing 23, for example, an in-vehicle blower fan can be configured.

The motor 10 according to the present embodiment described above may be electrically connected to an external circuit 25 disposed outside the motor 10 as described later. A countermeasure in consideration of such a case will be described. Here, as an example, it is assumed that the motor 10 is mounted on a vehicle.

Figure 2:
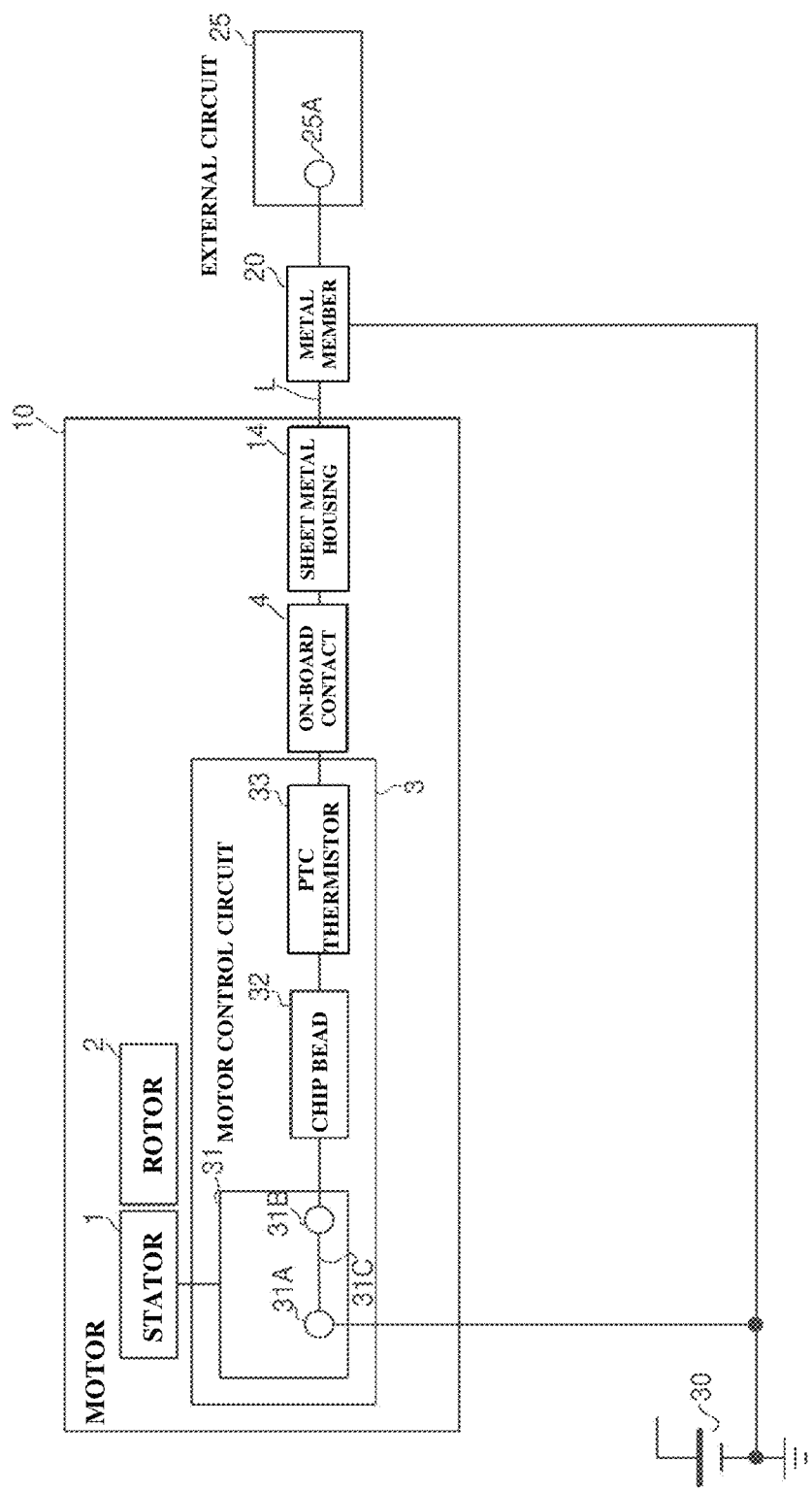
FIG. 2 is a block diagram illustrating an electrical connection configuration between a motor and an external circuit.

FIG. 2 is a block diagram illustrating an electrical connection configuration between the motor 10 and the external circuit 25. As illustrated in FIG. 2, in the motor 10, the motor control circuit 31, a chip bead 32, and a positive temperature coefficient (PTC) thermistor 33 are provided on the board 3.

The motor control circuit 31 outputs a drive signal to the coil in the stator 1 to cause a current to flow through the coil and controls rotation of the rotor 2. The motor control circuit 31 includes a first ground terminal 31A and a second ground terminal 31B. The first ground terminal 31A and the second ground terminal 31B are electrically connected by a wiring pattern 31C on the board 3.

The first ground terminal 31A is electrically connected to an application end of a ground potential for a battery 30 mounted on the vehicle by, for example, a lead wire. The second ground terminal 31B is electrically connected to a first end of the chip bead 32. A second end of the chip bead 32 is electrically connected to a first end of the PTC thermistor 33. A second end of the PTC thermistor 33 is electrically connected to the sheet metal housing 14 via the on-board contact 4. The chip bead 32 and the PTC thermistor 33 will be described in detail later.

As described above with reference to FIG. 1, the stator core 11 and the sheet metal housing 14 are fixed to the bearing holder 13. Since the bearing holder 13 is made of metal, the stator core 11 and the sheet metal housing 14 are electrically connected via the bearing holder 13. Therefore, the noise generated by the current flowing through the coil in the stator 1 is transmitted to the sheet metal housing 14 via the bearing holder 13. In the present embodiment, the sheet metal housing 14 is electrically connected to the second ground terminal 31B via the on-board contact 4 in order to suppress radiation of noise from the sheet metal housing 14. As a result, the noise transmitted to the sheet metal housing 14 is transmitted from the first ground terminal 31A to the ground side via the on-board contact 4 and the second ground terminal 31B, so that the radiation of the noise from the sheet metal housing 14 is suppressed.

As described above, since the sheet metal housing 14 and second ground terminal 31B are electrically connected to each other, the high-frequency noise due to switching in the motor control circuit 31 may be transmitted from the second ground terminal 31B to the sheet metal housing 14 via the on-board contact 4, and the high-frequency noise may be radiated from the sheet metal housing 14. Therefore, in the present embodiment, the chip bead 32 is provided between the second ground terminal 31B and the on-board contact 4.

The chip bead 32 is formed by chipping a so-called ferrite bead. In the ferrite bead, ferrite that is a material having a large loss in a high frequency region is used. Therefore, in the high frequency region, the current energy is lost as a loss in the ferrite, and the high frequency noise can be suppressed. In the present embodiment, by providing the chip bead 32, high frequency noise output from the second ground terminal 31B to the on-board contact 4 side is suppressed.

The sheet metal housing 14 is electrically connected to the metal member 20 disposed outside the motor 10. The metal member 20 is electrically connected to the sheet metal housing 14 by, for example, screwing. The external circuit 25 is disposed outside the motor 10.

For example, assuming that a blower fan including the motor 10 is a fan that blows cold air in a seat mounted on a vehicle, the metal member 20 is a seat frame, and the external circuit 25 is a circuit for a seat heater.

The external circuit 25 has an external ground terminal 25A. The external ground terminal 25A is electrically connected to the metal member 20 by, for example, a lead wire. The metal member 20 is connected to an application end of a ground potential for a battery 30 by, for example, a lead wire. As a result, the external circuit 25 can be grounded via the metal member 20.

With such a configuration, the ground terminal 31B in the motor control circuit 31 and the external ground terminal 25A in the external circuit 25 are electrically connected by a path L.

Here, a current may flow from the external ground terminal 25A of the external circuit 25 to the second ground terminal 31B side via the metal member 20, the sheet metal housing 14, and the on-board contact 4. In this case, if the PTC thermistor 33 is not provided, there is a possibility that the chip bead 32 is adversely affected when an overcurrent occurs in the current. Therefore, in the present embodiment, the PTC thermistor 33 is provided.

Figure 3:
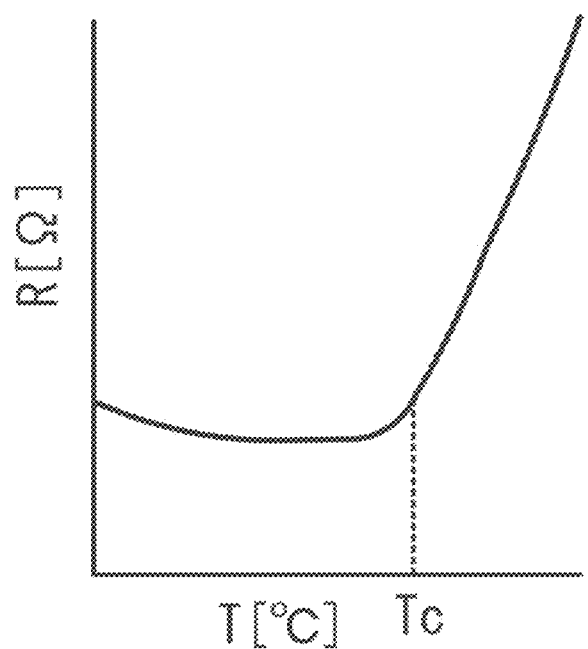
FIG. 3 is a schematic diagram illustrating an example of a temperature-resistance value characteristic in a PTC thermistor.

FIG. 3 is a schematic diagram illustrating an example of a relationship between the temperature T of the PTC thermistor and the resistance value R of the PTC thermistor. As illustrated in FIG. 3, the PTC thermistor has a characteristic that the resistance value R rapidly increases when the temperature T exceeds the Curie point Tc. By utilizing this characteristic, in the present embodiment, when an overcurrent occurs in the current flowing from the external ground terminal 25A to the second ground terminal 31B side, the temperature of the PTC thermistor 33 increases due to self-heating in the PTC thermistor 33, and the resistance value of the PTC thermistor 33 increases, so that the overcurrent flowing through the chip bead 32 can be suppressed.

As described above, the motor 10 according to the present embodiment includes the motor control circuit 31 having the ground terminal 31B, and the current limiting part (PTC thermistor 33) disposed on the path L electrically connecting the ground terminal 31B and the external ground terminal 25A included in the external circuit 25 disposed outside the motor 10. As a result, by suppressing the current flowing from the external ground terminal 25A to the ground terminal 31B side by the current limiting part, it is possible to suppress an adverse effect on the motor 10 due to the current.

The motor 10 includes the stator 1 and the rotor 2 radially opposed to the stator 1. The stator 1 includes the metal housing 14 that covers a part of the stator 1. The metal housing 14 is disposed on the path L. As described above, the metal housing 14 suppresses radiation of noise from the inside to the outside and intrusion of noise from the outside to the inside. The current limiting part can suppress the current flowing to the ground terminal 31B side via the metal housing 14.

As described above, the stator core 11 is electrically connected to the sheet metal housing 14 by the metal bearing holder 13. That is, a part of the stator 1 is electrically connected to the metal housing 14. The motor 10 includes a ferrite bead (chip bead 32) disposed on a path between the metal housing 14 and the ground terminal 31B.

The noise generated by the coil included in a part of the stator 1 is transmitted to the ground terminal 31B via the metal housing 14, and radiation of the noise from the sheet metal housing 14 made of metal can be suppressed. In addition, the high frequency noise generated by the motor control circuit 31 and transmitted from the ground terminal 31B to the metal housing 14 side is suppressed by the ferrite bead, and radiation of the high frequency noise from the sheet metal housing 14 made of metal can be suppressed. By suppressing the current flowing from the external ground terminal 25A to the ground terminal 31B side by the current limiting part, it is possible to suppress an adverse effect on the ferrite bead due to the current.

The housing 14 is electrically connectable to the metal member 20 disposed outside the motor 10. The metal member 20 is electrically connectable to the external ground terminal 25A and the application end of the ground potential. As a result, the external circuit 25 can be grounded via the metal member 20. The current limiting part can suppress the current flowing from the external ground terminal 25A to the ground terminal 31B side via the metal member 20 and the housing 14.

In the present embodiment, the current limiting part is the PTC thermistor 33. As a result, the PTC thermistor 33 self-heats due to the current flowing from the external ground terminal 25A to the ground terminal 31B side, so that the resistance value increases and the current is suppressed. The current limiting part can be realized with a small number of elements.

The current limiting part is the PTC thermistor 33, the stator 1 has a coil, and the motor 10 has the board 3 on which the motor control circuit 31 and the current limiting part are provided. It is desirable that the PTC thermistor 33 is disposed on the other side surface in the axial direction of the board 3. That is, it is desirable that the current limiting part is disposed on a surface of the board 3 on the side opposite to the coil side.

Figure 4:
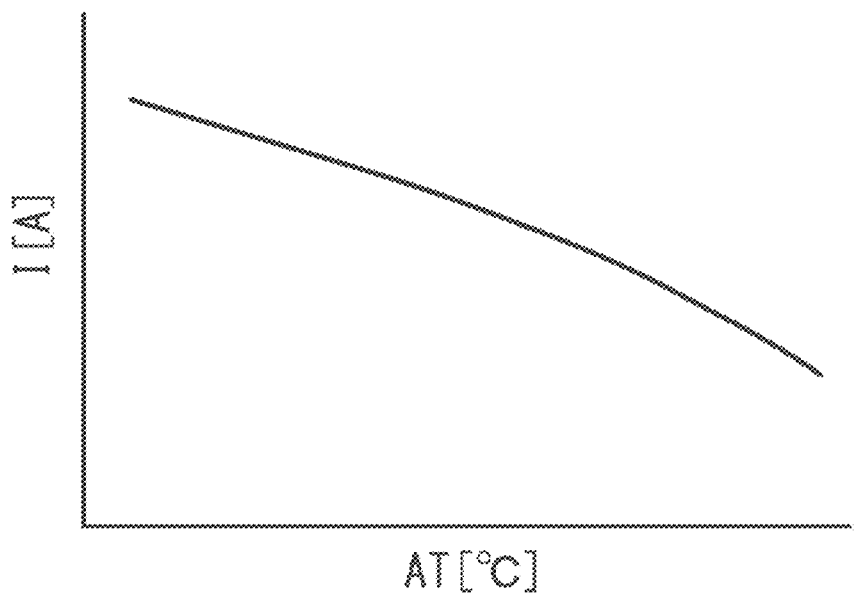
FIG. 4 is a schematic diagram illustrating an example of an environmental temperature-limited current minimum value characteristic in a PTC thermistor.

Here, FIG. 4 is a schematic diagram illustrating an example of a relationship between the environmental temperature AT of the PTC thermistor 33 and the minimum current value I at which the current flowing through the PTC thermistor 33 is limited. As described above, as the environmental temperature AT increases, the current is limited by less self-heating of the PTC thermistor 33, so that the minimum current value I decreases. Therefore, by disposing the current limiting part (PTC thermistor 33) on the surface of the board 3 on the side opposite to the coil side, it is possible to suppress an increase in the environmental temperature of the current limiting part due to heat generation of the coil, and it is possible to suppress inhibition of transmission of noise from the housing 14 to the ground terminal 31B side due to the limitation of the current.

Note that the chip bead 32 is not necessarily provided. Even when the chip bead 32 is not provided, the PTC thermistor 33 limits the current flowing from the external ground terminal 25A to the second ground terminal 31B side, so that an effect of suppressing an adverse effect on the motor control circuit 31 can be obtained.

Figure 5:
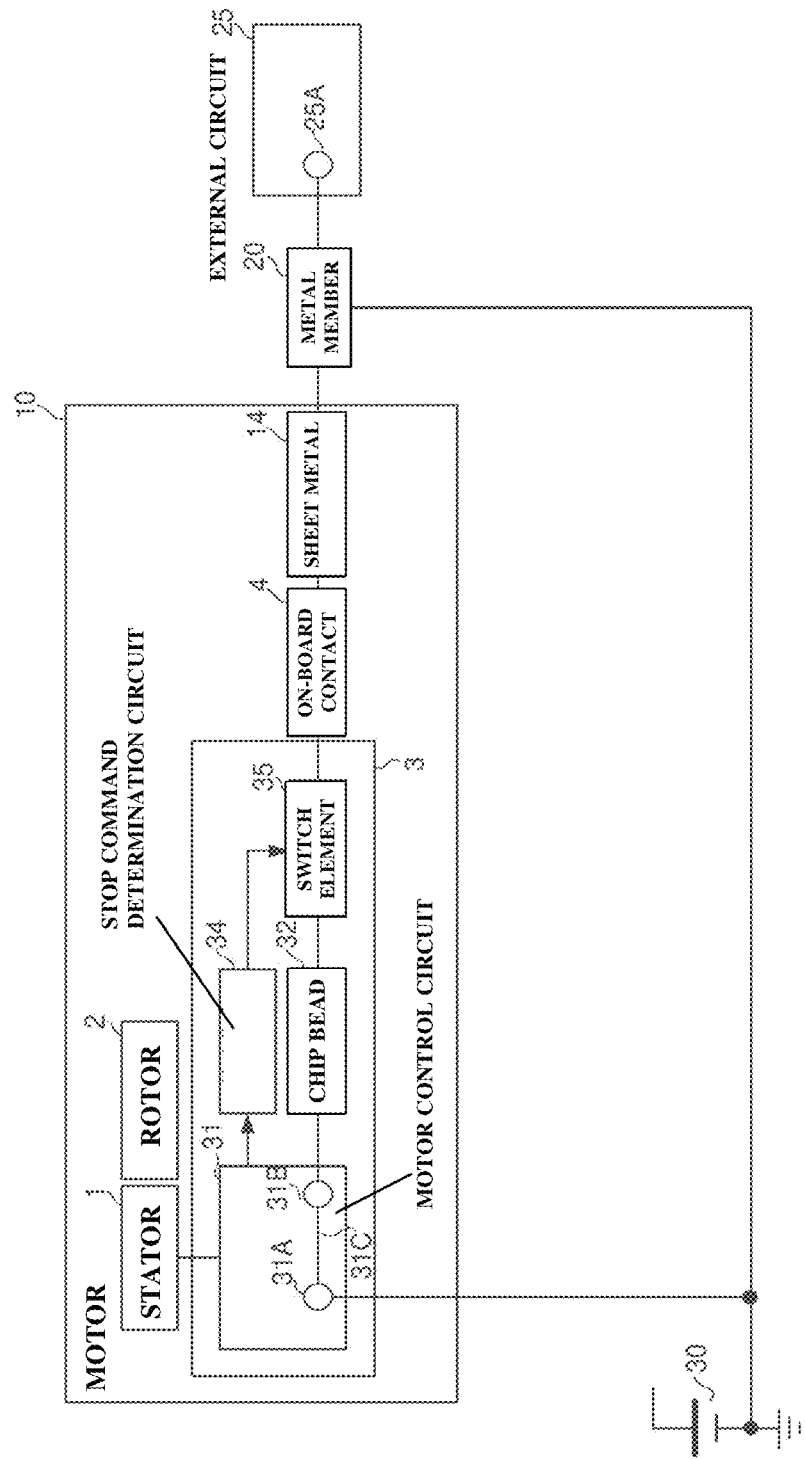
FIG. 5 is a block diagram including a configuration of a motor according to a first modification.

FIG. 5 is a block diagram including a configuration of a motor 10 according to a first modification. The difference from the above-described embodiment (FIG. 2) is that a switch element 35 is used as a current limiting part and that a stop command determination circuit 34 is provided on the board 3.

The stop command determination circuit 34 determines presence or absence of a rotation stop command for the rotor 2, based on a speed control signal (PWM signal) generated in the motor control circuit 31. The switch element 35 is disposed between the on-board contact 4 and the chip bead 32, and is constituted of, for example, a metal oxide semiconductor field effect transistor (MOSFET).

The switch element 35 is controlled to be turned on and off according to a determination result by the stop command determination circuit 34. Specifically, when the stop command determination circuit 34 determines that there is no rotation stop command for the rotor 2, the switch element 35 is controlled to be turned on, and when the stop command determination circuit 34 determines that there is a rotation stop command for the rotor 2, the switch element 35 is controlled to be turned off. That is, the motor 10 according to the first modification includes the stop command determination circuit 34 that determines presence or absence of a rotation stop command for the rotor 2, and the switch element 35 as a current limiting part that is controlled to be turned on and off by the stop command determination circuit 34.

In the present modification, it is assumed that the external circuit 25 is stopped when the motor 10 is operated, and the external circuit 25 is operated when the motor 10 is stopped. For example, when the motor 10 is used for a vehicle seat fan and the external circuit 25 is used for a seat heater, the above control is effective.

When there is no rotation stop command for the rotor 2 during operation of the motor 10, the switch element 35 is turned on. As a result, the noise generated by the coil during the operation of the motor 10 is transmitted to the second ground terminal 31B via the sheet metal housing 14 and the switch element 35, and radiation of the noise from the sheet metal housing 14 is suppressed. At this time, since the external circuit 25 does not operate, no current flows from the external ground terminal 25A to the second ground terminal 31B even when the switch element 35 is turned on.

On the other hand, when an rotation stop command for the rotor 2 is issued during operation of the motor 10, the switch element 35 is turned off. Since the motor 10 stops, no noise is generated from the coil, and the switch element 35 may be turned off. At this time, even when the external circuit 25 operates, since the switch element 35 is turned off, it is possible to prevent a current from flowing from the external ground terminal 25A to the second ground terminal 31B side. That is, the switch element 35 functions as a current limiting part.

Figure 6:
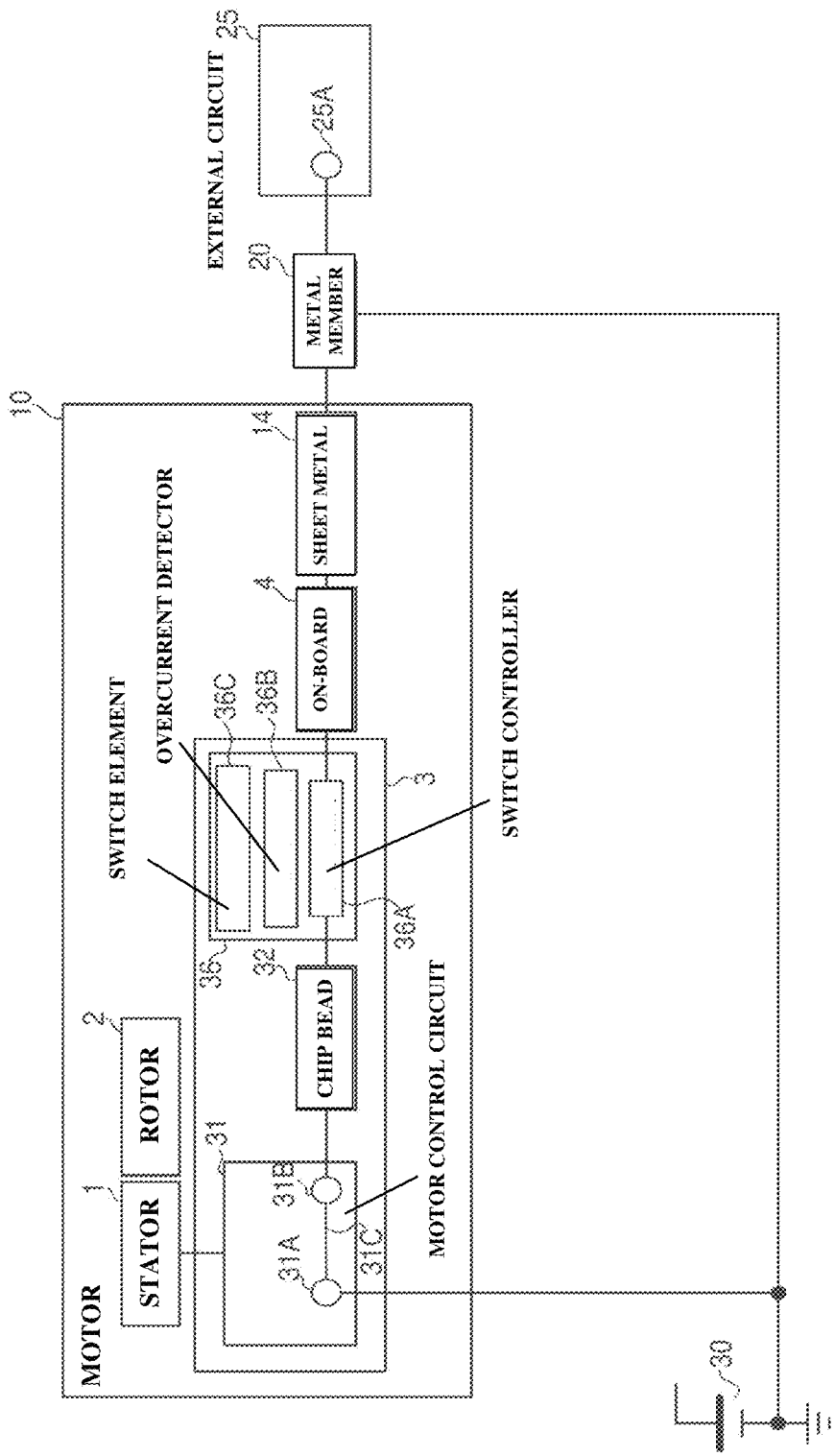
FIG. 6 is a block diagram including a configuration of a motor according to a second modification.

FIG. 6 is a block diagram including a configuration of a motor 10 according to a second modification. The difference from the above-described embodiment (FIG. 2) is that an overcurrent protection unit 36 is provided on the board 3. The overcurrent protection unit 36 includes a switch element 36A, an overcurrent detector 36B, and a switch controller 36C. That is, the motor 10 includes the switch element 36A, the overcurrent detector 36B, and the switch controller 36C.

The switch element 36A as a current limiting part is disposed between the chip bead 32 and the on-board contact 4, and is constituted of, for example, a MOSFET. The overcurrent detector 36B detects an overcurrent flowing through the switch element 36A. The switch controller 36C controls on/off of the switch element 36A according to a detection result of the overcurrent detector 36B. When the overcurrent is detected by the overcurrent detector 36B, the switch controller 36C turns off the switch element 36A.

During the normal operation, the switch controller 36C turns on the switch element 36A. As a result, the noise generated by the coil is transmitted to the second ground terminal 31B via the sheet metal housing 14 and the switch element 36A. When an overcurrent flows from the external ground terminal 25A of the external circuit 25 via the switch element 36A, the overcurrent is detected by the overcurrent detector 36B, so that the switch controller 36C turns off the switch element 36A. As a result, the switch element 36A functions as a current limiting part, and an overcurrent is prevented from flowing from the external ground terminal 25A to the second ground terminal 31B side.

The embodiment of the present disclosure is described above. Note that the scope of the present disclosure is not limited to the above embodiment. The present disclosure can be implemented by making various changes to the above-described embodiment without departing from the gist of the invention. The matters described in the above embodiment can be optionally combined together, as appropriate, as long as there is no inconsistency.

The technology of the present disclosure can be used for, for example, an in-vehicle motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a motor control circuit having a ground terminal; and
a current limiting part disposed on a path electrically connecting the ground terminal and an external ground terminal included in an external circuit disposed outside the motor.

2. The motor according to claim 1, further comprising a stator and a rotor radially opposed to the stator, wherein
the stator includes a metal housing that covers a part of the stator, and
the metal housing is disposed on the path.

3. The motor according to claim 2, wherein
the part of the stator is electrically connected to the metal housing, and
the motor further comprises a ferrite bead disposed on a path between the metal housing and the ground terminal.

4. The motor according to claim 2, wherein
the housing is electrically connectable to a metal member disposed outside the motor, and
the metal member is electrically connectable to the external ground terminal and an application end of a ground potential.

5. The motor according to claim 3, wherein
the current limiting part is a PTC thermistor,
the stator includes a coil,
the motor further comprises a board on which the motor control circuit and the current limiting part are provided, and
the current limiting part is disposed on a surface of the board on a side opposite to a coil side.

6. The motor according to claim 1, wherein the current limiting part is a PTC thermistor.

7. The motor according to claim 1, further comprising:
a switch element as the current limiting part;
an overcurrent detector that detects an overcurrent flowing through the switch element; and
a switch controller that turns off the switch element when the overcurrent is detected by the overcurrent detector.

8. The motor according to claim 1, wherein the current limiting part is a positive thermal coefficient (PTC) thermistor.

9. The motor according to claim 1, wherein the current limiting part is on a same board as the motor control circuit.

10. A motor comprising:
a motor control circuit having a ground terminal;
a current limiting part disposed on a path electrically connecting the ground terminal and an external ground terminal included in an external circuit disposed outside the motor;
a stator and a rotor radially opposed to the stator, wherein
the stator includes a metal housing that covers a part of the stator, and
the metal housing is disposed on the path, wherein
the part of the stator is electrically connected to the metal housing, and
the motor further comprises a ferrite bead disposed on a path between the metal housing and the ground terminal;
a stop command determination circuit that determines presence or absence of a rotation stop command for the rotor; and
a switch element as the current limiting part that is controlled to be turned on and off by the stop command determination circuit.

* * * * *